United States Patent [19]

Tozoni

[11] Patent Number: 5,218,257

[45] Date of Patent: Jun. 8, 1993

[54] MAGNETIC LEVITATION SELF-REGULATING SYSTEMS

[75] Inventor: Oleg Tozoni, Rockville, Md.

[73] Assignee: Maglev Technology, Inc., Gaithersburg, Md.

[21] Appl. No.: 864,258

[22] Filed: Apr. 6, 1992

Related U.S. Application Data

[63] Continuation-in-part of Ser. No. 764,734, Sep. 24, 1991, and a continuation-in-part of Ser. No. 691,431, Apr. 25, 1991, Pat. No. 5,140,208, and a continuation-in-part of Ser. No. 691,430, Apr. 25, 1991, which is a continuation-in-part of Ser. No. 593,082, Oct. 5, 1990, abandoned.

[51] Int. Cl.$^5$ .................... H02K 7/09; B60L 13/04
[52] U.S. Cl. ........................... 310/90.5; 104/281
[58] Field of Search ............... 310/90.5, 12, 152, 254; 104/281, 282, 283, 286

[56] References Cited

U.S. PATENT DOCUMENTS

| | | | |
|---|---|---|---|
| 3,842,753 | 10/1974 | Theodore et al. | 104/148 MS |
| 3,937,148 | 2/1976 | Simpson | 104/148 MS |
| 3,939,776 | 2/1976 | Ross et al. | 104/23 FS |
| 4,711,182 | 12/1987 | Alexandrov et al. | 104/283 |
| 5,067,415 | 11/1991 | Morishita et al. | 104/281 |

Primary Examiner—Steven L. Stephan
Assistant Examiner—Matthew Nguyen
Attorney, Agent, or Firm—Kenyon & Kenyon

[57] ABSTRACT

Magnetic levitation self-regulating systems designated for forward and rotating motion and stable hovering of heavy masses (working bodies) in both gravity and weightlessness are proposed. This system includes a stator assembly and a levitator assembly. The stator assembly comprises split iron cores with air gaps between their core shoes fixed on a non-magnetic foundation. The levitator assembly comprises permanent magnets coupled together by non-magnetic couplers and disposed into the air gaps of the stator assembly. The levitator magnets are magnetized across the air gaps of the stator and generate the primary magnetic field, magnetizing the iron cores, which, in turn, create a secondary magnetic field. The resulting magnetic field creates a stabilizing levitational force providing a stable hovering of the levitator without any automatic control system or additional energy consumption.

13 Claims, 11 Drawing Sheets

MAGNETIC LEVITATION SELF-REGULATING SYSTEMS

CROSS REFERENCE TO RELATED APPLICATIONS

This application is a continuation-in-part of application Ser. No. 691,430, filed Apr. 25, 1991, which is a continuation-in-part of Ser. No. 593,082, filed Sep. 17,1990, now abandoned; and application Ser. No. 691,431, filed Apr. 5, 1991 issued with U.S. Pat. No. 5,140,208 and application Ser. No. 764,734, filed Sep. 24, 1991.

BACKGROUND OF THE INVENTION

The present invention relates generally to magnetic levitation devices and more particularly to magnetic levitation self-regulating systems comprising permanent magnets and ferromagnetic cores capable of providing the stable hovering of a working body in a magnetic field without any active control system.

In the year of 1839 S. Earnshaw published a theorem [S. Earnshaw: Trans. Cambridge Philosophical Society 7. 97–112 (1839)]. It states that charged bodies in any electrostatic field do not have a stable equilibrium position when they are solely under the influence of electrostatic forces. One hundred years later W. Braunbek [W. Braunbek: Z. Physik. 112 753-763 (1939)] extended Earnshaw's theorem to magnetostatic fields. Proofs of these theorems are based on the properties of the scalar potential of a static field. Such a potential, being a solution of Laplace's equation, cannot have an extrema in any inward point of a field. It is important to note that both of these theorems hold true for a system of free bodies placed in a field. In this case, any body in the field will drift along the lines of force toward the field borders (i.e. conducting or ferromagnetic surfaces) until contacting the border.

However, if bodies are connected with each other by non-conducting or non-magnetic couplers and placed in independent fields, it is obvious that they cannot move freely along the lines of force. To describe their movement it is necessary to complete Laplace's equation (with appropriate boundary conditions) with the equations for the couplers. Thus, the theorems mentioned above are not correct under these circumstances.

Unfortunately, this important realization concerning Laplace's equation was unrecognized, and these theorems are still used today to assert the impossibility of creating a stable levitation system consisting of charged or magnetic bodies in an electrostatic or magnetostatic field regardless of whether there are couplers between them or not. Consequently, designers have concentrated on the improvement of automatic control systems to provide stability of levitation rather than conducting research concerning as yet unknown principles of self-regulation that would allow self-regulating magnetic levitation systems to be created.

Langrange's theorem is used to determine the stability of the equilibrium position of any conservative system. [Pol Appell: Traite de Mecanique Rationnelle. Paris, Gauthier-Villars, Etc. Editeurs ]. The theorem states that if at a certain position of a conservative system, the potential energy has a strict local minimum, then that position is a stable equilibrium point of the system. It is worth noting that this theorem and the two cited above do not contradict one other. Lagrange's theorem covers a broader range of cases then the earlier cited theorems. Specifically, it can be applied to a conservative system with couplers.

It is known that the existing magnetic levitation systems of the electromagnetic type use iron cores and electromagnets with an air gap here between. The magnets do not have an equilibrium position therein, and the magnetic field is distributed in such a way as to create destabilizing forces only, tending to attract the magnets to the iron cores.

In order to provide stability to the known systems, a fast-response, automatic control system is necessary. Such control is expensive to provide and has up until now not been very reliable.

The magnetic levitation self-regulating systems of the present invention use quite different elements from the known systems and include split iron cores with an air gap between their shoes rather than solid cores. Furthermore the present invention uses permanent magnets rather than electromagnets. This structure provides an equilibrium position for permanent magnets in the air gap and the distribution of the magnetic field therein is capable of creating both stabilizing and destabilizing forces.

A linear synchronous motor having variable pole pitches is disclosed in U.S. patent application Ser. No. 691,430, a linear synchronous motor having enhanced levitational forces U.S. patent application Ser. No. 764,734, a selfadjusting magnetic suspension for a levitated vehicle guideway U.S. patent application Ser. No. 691,431, serve as examples of these elements.

SUMMARY OF THE INVENTION

The present invention has recognized that it is not impossible to create a stable magnetic levitation system as had been previously thought. As a consequence of this development, a new, quite different, mechanical interaction between physical bodies and a magnetic field (without contact and friction) is possible, which allows one to considerably increase the speed of the interacting moving bodies.

It is possible to show that in the case where permanent magnets are placed in independent magnetostatic fields and connected to one other by rigid non-magnetic couplers, the potential energy of such a system may have a strictly local minimum on a certain position of bodies in field regions. Potential energy extrema are determined not only by properties of Laplace's potentials, but also by equations for the couplers, reflecting the restrictions on the movement of the bodies under the effect of the field. Two essential conditions should be satisfied to make this latter assertion true:

a) the bodies should be connected to each other by rigid non-magnetic couplers; and b) the bodies comprising the system are placed in different, independent magnetic fields or fields of different types (e.g., magnetic and gravitational).

The magnetic levitation self-regulating system requires two major components. First, a stator assembly includes cylindrical iron cores, extended along its cylinder generatrix, with a symmetrical air gap extending between the core shoes of the core. All the iron cores of the stator assembly are rigidly connected to one another and are fixed on a non-magnetic foundation, thus forming the stationary component of the levitation system. The second major component is a levitator assembly that includes cylindrical permanent magnets having a rectangular cross-section, which are coupled together by rigid non-magnetic couplers disposed in the air gap. The permanent magnets are magnetized in a direction across the air gap. The levitator assembly is the movable component of the levitation system and it is capable of stably hovering in the magnetic field while supporting a heavy mass (i.e., a working body such as a vehicle). The permanent magnets of the levitator generate the original magnetic field and magnetize the stator iron cores. The iron cores create a secondary magnetic field. Both the original and secondary fields create the magnetic levitating force, providing stable hovering of the levitator in the resulting magnetic field.

The stability of the levitator along two or three mutually perpendicular directions is required for engineering applications: forward and rotational motion of the working body or its stable hovering in the vicinity of its equilibrium position. In both cases, to provide stability to the position of the levitator, it is necessary to create a distribution of the magnetic field in the air gaps of the stator cores such that any displacement of the levitator from its equilibrium position will instantaneously generate stabilizing forces tending to restore the levitator. The properties of any system depend on the properties of its components. The components of the system of the invention comprise:

a. two identical cylindrical parts of a split iron core that are symmetrical and parallel to one another and which are rigidly connected by non-magnetic couplers in such a way as to form an air gap of constant width;

b. a magnetic unit formed by two cylindrical permanent magnets having a rectangular cross-section, which are also parallel to one another and connected together by a non-magnetic tie.

The magnetic unit is disposed in the air gap between the two parts of the iron core and is oriented along the gap. However, the cylindrical magnets of the magnetic unit are magnetized across the gap and point in a direction opposite to one another.

The primary magnetic field of the permanent magnets generates the distribution of the resulting magnetic field in the gap that is capable of providing the total sum of all the forces applied to the magnetic unit, which is equal to zero when the magnetic unit is symmetrically placed within the gap. Hence, the symmetrical position of the magnetic unit is its equilibrium position.

Analytical and experimental investigations has shown that the components of the system have the following characteristics:

a. any displacement of the magnetic unit across the air gap (within the cross-section of the core) produces a destabilizing force that attracts the magnetic unit to the nearest half of the core. The value of this force is proportional to the square of the displacement value;

b. any displacement of the magnetic unit along the air gap (within the cross-section of the core) produces a stabilizing force that tends to restore the unit to its symmetrical equilibrium position;

c. the stiffness of the stabilizing force (i.e., the derivative of the force with respect to the displacement coordinate) applied to the magnetic unit in the vicinity of its equilibrium position can be increased from zero to a maximum by changing the length of the coupler between the two permanent magnets in the unit;

d. if the stabilizing forces are assumed to be oriented upwards, and the destabilizing forces downward, then the force distribution applied to the magnetic unit, which is a function of its displacement in the gap, has a saddle-shaped surface with a minimum equal to zero in the vicinity of the origin (i.e., at the equilibrium position of the magnetic unit). Further, this surface can be sharpened without sacrificing its saddle shape near the origin by adjusting the length of the coupler between the magnets.

By utilizing the above-mentioned features of the invention, it is possible to design various magnetic levitation self-regulating systems by connecting similar components (and thus forming the above said stator and levitator) in such a way as to orient the stabilizing forces in mutually perpendicular directions and thus suppress the destabilizing forces.

In reality, in every single component the directions of the stabilizing and destabilizing forces are mutually perpendicular, and in the vicinity of the origin the values of the destabilizing forces and their associated rigidities are approximately zero. Thus, due to the above-mentioned sharp minimum in the saddle-shaped surface of the force distribution in the vicinity of the origin, the coupling of the components allows the stabilizing forces to prevail over the destabilizing ones, thus providing the requisite stability for the levitator.

The present invention can be utilized in a wide variety of applications. These applications include a magnetic levitation system for the suspension of a vehicle in a high speed ground transportation system and magnetic bearings that are capable of operating in a gravitational field as well as in a weightless environment. The present invention is equally applicable to different types of magnetic suspension systems.

DETAILED DESCRIPTION

The present invention is concerned with various types of magnetic levitation self-regulating systems that can be classified by the following criteria:

1. systems that are distinguished by their degree of freedom, which include:
   a. systems possessing two-dimensional stability which are used for stabilizing the trajectory of a vehicle (the working body) undergoing forward motion or for providing rotational motion around the pivot axis without distortion;
   b. systems possessing three-dimensional stability for providing the stable hovering of the working body in the vicinity of its equilibrium position;
2. systems that are distinguished by specific operational conditions such as:
   a. systems operating in a gravitational field, which provide: forward motion, rotational motion around either the horizontal or the vertical pivot axis, and stable hovering in the magnetic field;
   b. systems operating in a weightless environment and performing the same functions as in 2(a) above.

In spite of such variety in the types of magnetic levitation self-regulating systems, their structures are composed of the same elements and operate according to the same principles.

Figure 7:
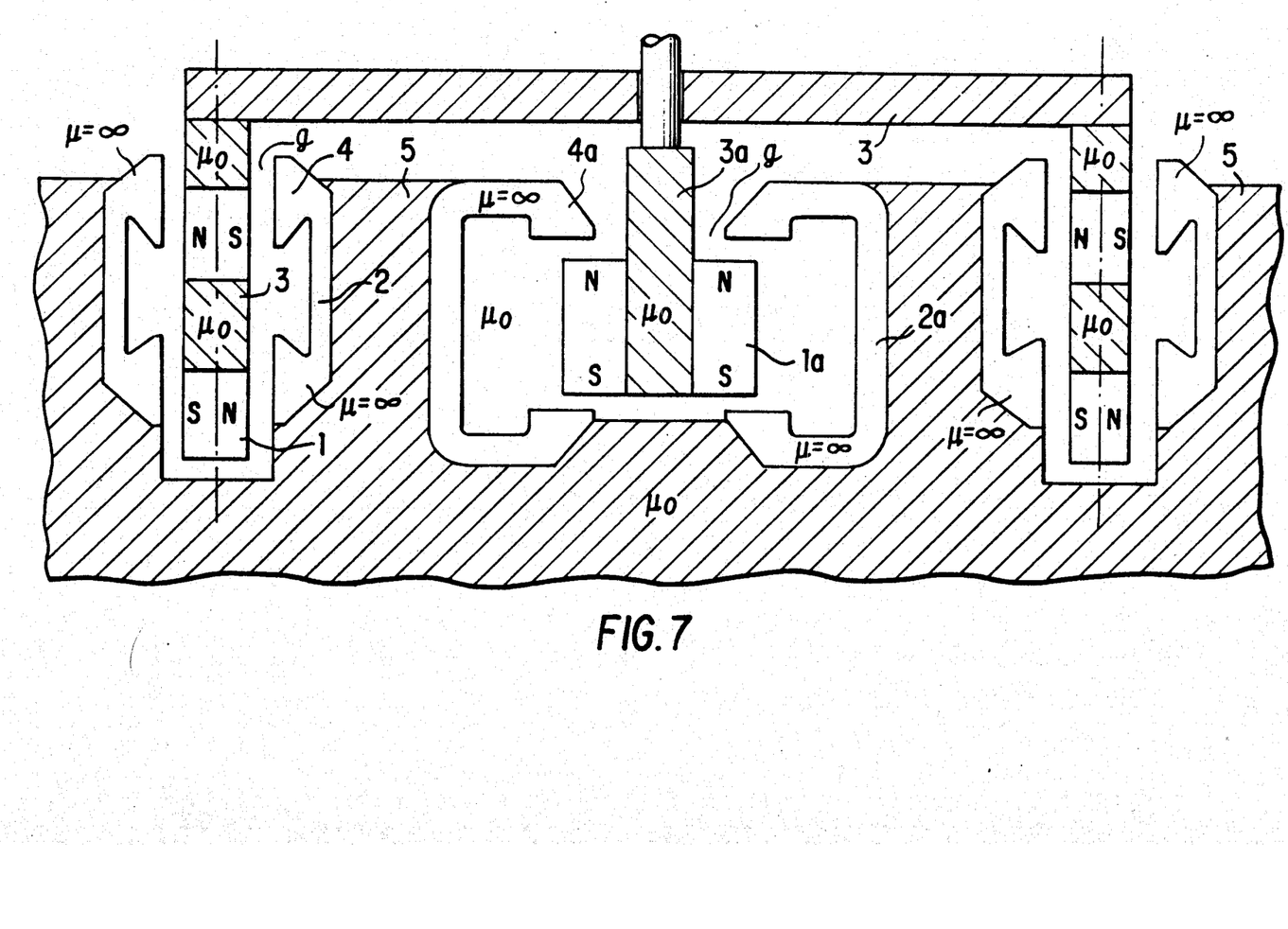
FIG. 7 is a cross-sectional view of the magnetic levitation self-regulating system that provides stable forward motion for a vehicle along an assigned trajectory, such as for a high speed ground transportation system.

As seen in FIG. 7, the magnetic levitation self-regulating system has two major components. A stator assembly includes cylindrical iron cores 2,2a, that extend along its cylinder generatrix. A symmetrical air gap g extends between the core shoes 4,4a. All the iron cores 2,2a of the stator assembly are rigidly connected to one other and are fixed on a non-magnetic foundation 5 to form the stationary component of the levitation system.

The second major component is a levitator assembly that includes cylindrical permanent magnets 1,1a of rectangular cross-section, which are coupled together by rigid non-magnetic couplers 3,3a. The magnets 1,1a are disposed in the air gap and are magnetized across the gap (i.e., perpendicular to the longitudinal axis of the magnets). The levitator assembly, which is a movable part of the levitation system, is capable of stably hovering in the magnetic field and supporting a heavy mass (such as a vehicle or other working body). The permanent magnets of the levitator generate the original magnetic field and magnetize the stator iron cores. The iron cores create a secondary magnetic field. Both the original and secondary fields create a magnetic levitating force, providing a stable hovering of the levitator in the resulting magnetic field of the system.

To provide stability in the position of the levitator assembly it is necessary to create a magnetic field distribution in the gaps of the stator cores such that any displacement of the levitator assembly from its equilibrium position instantaneously generates the stabilizing forces that tend to restore the levitator.

The properties of any composite system depend on its componential properties. Therefore, each component of the magnetic levitation system should have an equilibrium position and generate a stabilizing force.

The following discussion will demonstrate how to create a levitation system that involves permanent magnets and ferromagnetic cores that is capable of providing the stable hovering of the levitator in a magnetic field while supporting a heavy mass referred to as a "working body".

Figure 1A:
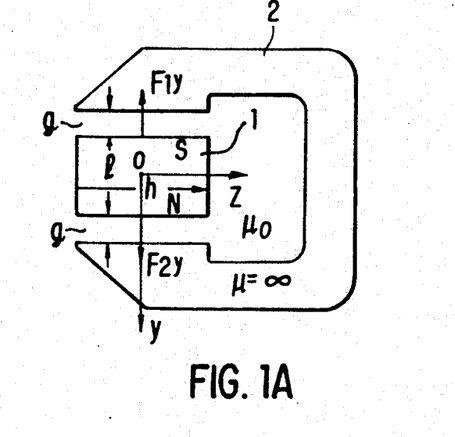
FIG. 1A is a cross-sectional, front view of a simple magnetic device used as a component of the magnetic levitation self-regulating system constructed according to the principles of the present invention.

Consider a simple magnetic device (see FIG. 1A) that includes:

A cylindrical iron core ($\mu = \infty$) 2 having a C-shaped cross-section, which extends along the cylinder generatrix (axis OX) with a symmetrical air gap between its core shoes 4.

A cylindrical permanent magnet 1 having a rectangular cross-section with dimensions ($l \times h$) is disposed in the air gap and is magnetized across the gap. The cylindrical generatrices of both cylinders are parallel to each other. The distance (i.e., the air gap) between the magnetic poles and the core shoes is a constant and equal to g.

As a consequence of the symmetry of the device, the forces $F_z$ are equal to zero and the forces $F_{y1}$ and $F_{y2}$ of attraction of the magnet to both core shoes are equal to one other. Therefore, the sum of all the magnetic forces applied to the permanent magnet is equal zero when the permanent magnet is in a symmetrical position. Thus, the symmetrical position of the magnet is its equilibrium position.

Displacing the magnet along axis OZ by a distance z results in the generation of a force $F_{sz}$. This force tends to move the magnet back to its initial symmetrical position and give it a direction quite opposite to the magnet displacement. Thus, the position of the magnet is stable while moving along the axis OZ. This force is referred to as the "stabilizing force".

Figure 1B:
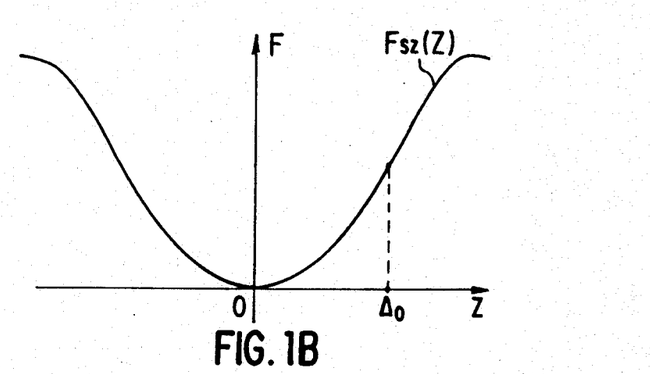
FIG. 1B is a graph of the profile of the stabilizing force distribution as a function of the displacement of the magnet along the gap.

Analytical investigations and experiments have indicated that the profile of $F_{sz}$ as a function of the displacement z of the magnet is as shown in FIG. 1B. The stabilizing force in this figure, and all the discussion that follows is assumed to be oriented upwards. One can see that the convexity of the curve $F_{sz}$ for small displacements is directed downward, while the convexity for larger displacements is directed upward.

The concept of the "stiffness of a magnetic force" is defined as the derivative of the force F with respect to the displacement z of the permanent magnet, which is mathematically described as $k = dF/dz$. The stiffness of the stabilizing force in the device increases as the displacement of the magnet increases, reaching a maximum of $k_m$ under a certain displacement $z=\Delta_0$, (abscissa of the inflection point of the curve $F_{sz}(z)$ and then decreases even though the displacement continues to grow.

Figure 1C:
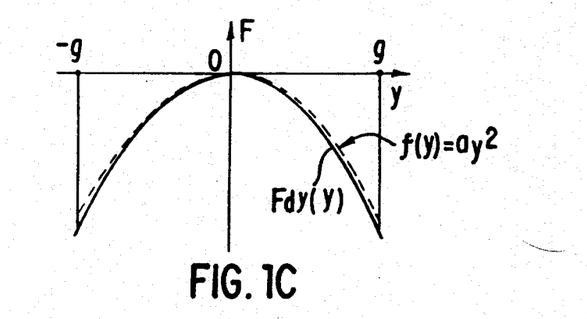
FIG. 1C is a graph of the profile of the destabilizing force distribution as a function of the displacement of the magnet across the gap.

Displacing the magnet along the transverse direction of axis OY by a distance y generates a "destabilizing force" $F_{dy}=F_{y1}-F_{y2}$ that tends to increase the displacement. Thus, the position of the magnet becomes unstable in the Y direction. An analytical evaluation has indicated that the profile of $F_{dy}$ as a function of the magnet displacement y is as shown in FIG. 1C. One can see that this curve almost coincides with the quadratic parabola $f_y(y)=ay^2$ (the dashed curve in FIG. 1C). The destabilizing force in this figure, and all of the following discussion, is assumed to be oriented downwards.

Figure 2:
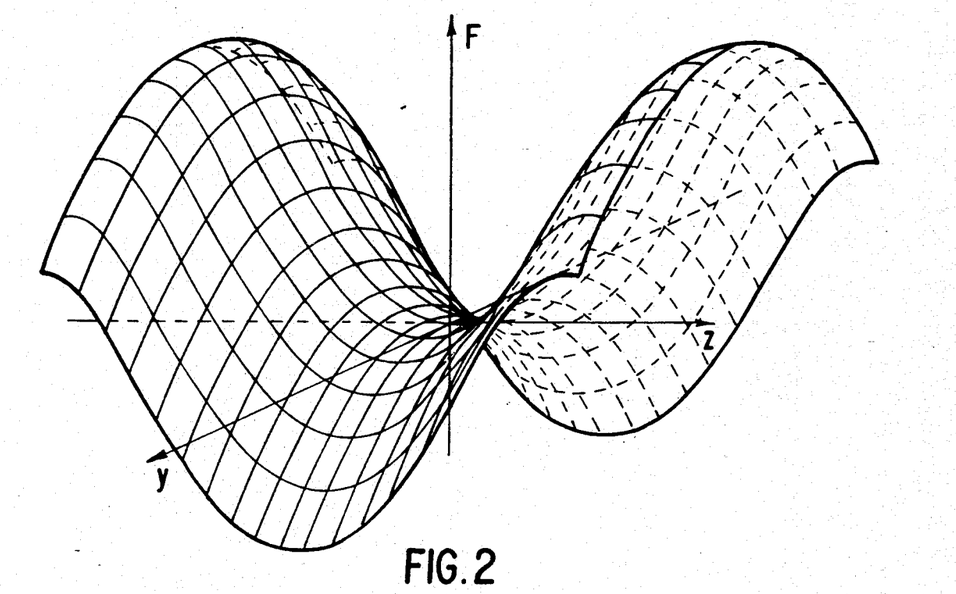
FIG. 2 is a diagram of the magnetic force distribution applied to the permanent magnet as a function of an arbitrary displacement of the magnet in the plane coincident with the cross-section of the gap.

FIG. 2 shows a graph of the distribution of the resulting force $F(y,z)$ that is applied to the magnet when displaced arbitrarily in the cross-sectional plane YOZ. The function $F(y,z)$ has a smooth saddle-shaped surface with a smooth minimum at $F(0,0)=0$.

The stabilizing and destabilizing forces affect the magnet in two mutually perpendicular directions. Thus, it seems that two devices located mutually perpendicular to one other, with their cores and magnets connected separately by rigid non-magnetic couplers, could create a stable levitation system that suppresses the destabilizing forces with stabilizing ones.

However, such a result will not occur because in the vicinity of the equilibrium position of the magnet, the stabilizing and destabilizing forces have the same order of magnitude and hence reliable stability is not practical.

Thus, the simple magnetic device described up to this point does not have all the properties necessary for building a stable magnetic levitation system.

To build a satisfactorily stable system it is necessary to have magnetic devices with a stabilizing force stiffness substantially greater than the destabilizing force stiffness in the vicinity of the equilibrium position of the magnet.

It will next be shown how to maximally increase the stiffness of the stabilizing forces in magnetic devices (see in example, the follwing pending U.S. patent applications: Ser. No. 691,431 and Ser. No. 764,734). This increase can be achieved by preliminarily shifting the magnet from an equilibrium position to the position corresponding to the abscissa of the inflection point of the stabilizing force profile. There are two different displacements that may correspond to this preliminary shift:

1. a structural shift, which is determined by the length of the coupler; and
2. the shift affected by the weight of the working body.

To explain the preferred displacement in detail, consider a component (see FIG. 4A) consisting of two identical simple magnetic devices whose axes are rotated by $\pi/2$. The cores of the device extend parallel to one another with a distance $t_0$ between them and they are rigidly fixed to one other. The magnets are rigidly coupled in parallel at a distance $t_0$ and from a magnetic unit. Given that the force $F_{sy}(y)$ (corresponding to $F_{sz}(z)$ in FIG. 1B) applied to the permanent magnet of a simple magnetic device has already been determined above, it is now easy to determine the resulting force $F_{y\Sigma}(y)$ applied to the magnetic unit.

Figure 4A:
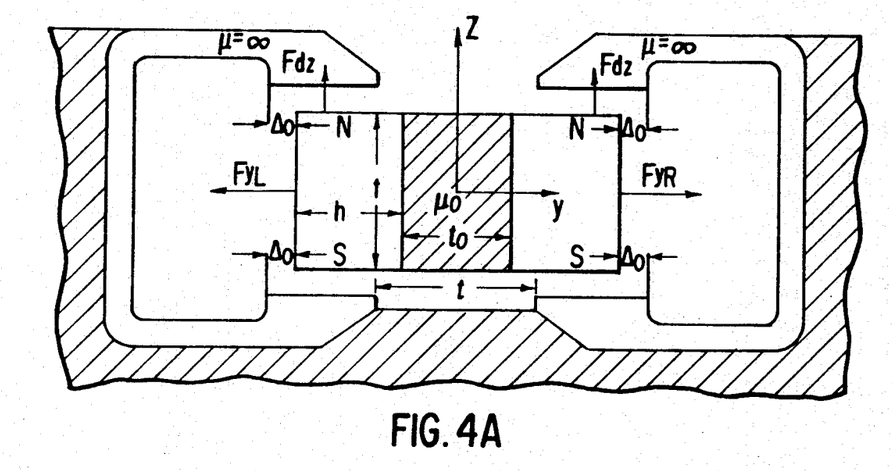
FIGS. 4A and 4B are, respectively, a cross-sectional view of the stabilization device constructed according to the principles of the present invention and a graphical profile of the magnetic destabilizing forces distribution applied to the magnetic unit as a function of its displacement along the gap, as well as a graphical profile of the magnetic stabilizing forces applied to the other mutually perpendicular magnetic unit as a function of its displacement along the gap.

The force $F_y(y)$ attracts a single permanent magnet into the gap between the two core shoes and depends only on the displacement of the magnet from its equilibrium position. The force $F_{y\Sigma}(y)$ depends not only on the displacement of the single magnet but also on the distance $t_0$ between the two magnets in the magnetic unit.

The equilibrium position of the magnetic unit coincides with the symmetrical center of the component, with each magnet preliminarily shifted against the center of the air gap of its own core (i.e., its former equilibrium position) by a distance $$y=(t-t_0)/2$$

Figure 4B:
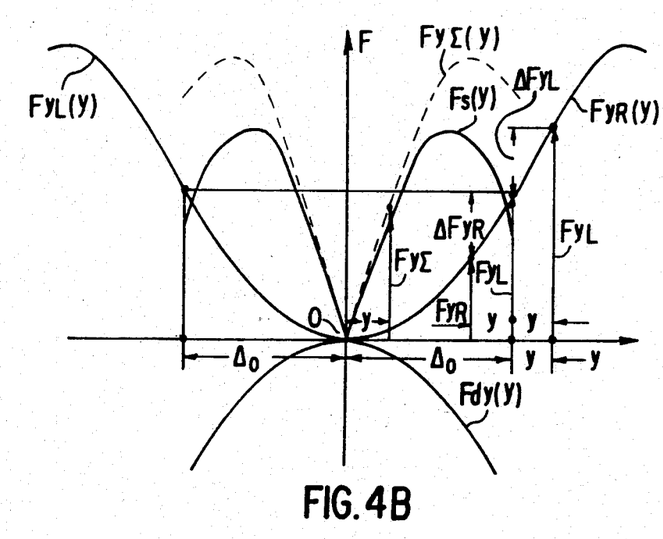

This means that if the magnetic unit is in its equilibrium position, two equal but oppositely directed forces $F_{yL}(y)$ and $F_{yR}(y)$ (on the left hand and on the right hand of the magnetic unit, respectively) are applied to the coupled magnets. As soon as the magnetic unit is displaced from its equilibrium position, the magnitude of these forces are changed in opposite directions. Thus, under a displacement y to the right, the force $F_{yR}$ decreases by a value $\Delta F_{yR}=k(y)y$, while the force $F_{yL}$ increases by a value $\Delta F_{yL}=k(y)y$. The parameter y is the displacement of the magentic unit from the equilibrium position (FIG. 4B). The resulting force $F_{y\Sigma}$ that tends to return the magnetic unit to its equilibrium position is:

$$F_{y\Sigma}(y)=F_{yL}(y)-F_{yR}(y)=2k(y)y$$

It is important to note that the stabilizing force stiffness of the component in the vicinity of the equilibrium position can be changed from $k=0$ (when $t_0=t$) to $k=2k_m$ (When $t_0=t-2\Delta_0$), where $\Delta_0$ is the optimum value of the preliminary shift of each magnet in the unit (FIG. 4B) (i.e., the abscissa of the inflection point). This component is called the "stabilization device".

The curve $F_{y\Sigma}(y)$, with its maximum possible stiffness $k=2k(\Delta_0)=2k_m$, is shown in FIG. 4B by the dashed line.

Another version of the stabilization device, which has two iron cores and the magnetic unit (FIG. 5A), has similar properties (see patent application Ser. No. 691,431). In this stabilization device the poles of one of the magnets in the magnetic unit are inverted relative to the other. The cores of the device are turned to contact one another at their backs with the resulting magnetic flux in these assembled backs equal to zero, as a consequence of which they are completely removed. If the distance between the two magnets is $t_0=t+2\Delta_0$, the stabilizing force stiffness in the component reaches a maximum and equals $2k_m$.

Figure 5A:
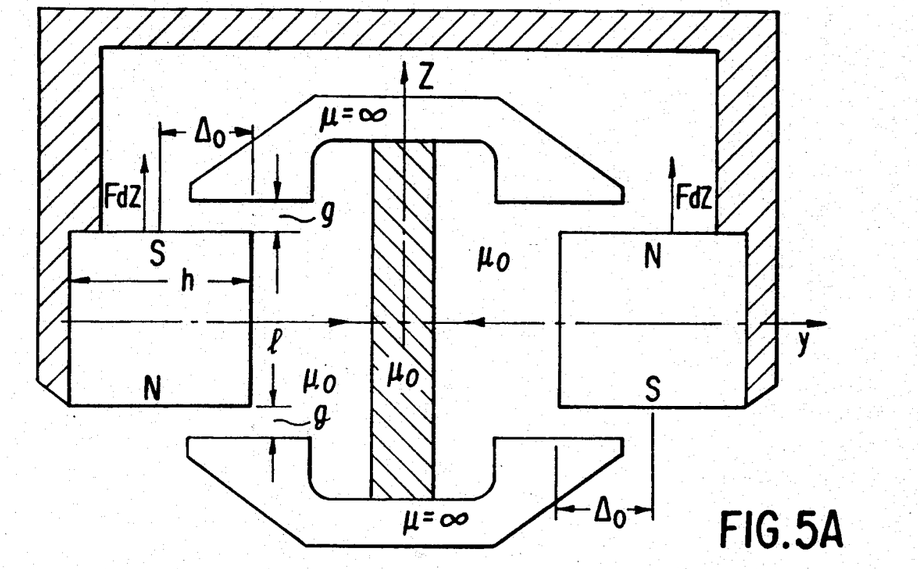
FIGS. 5A and 5B are, respectively a cross-sectional view of an alternative embodiment of the stabilization device of the present invention and graphical profiles of the magnetic stabilizing and destabilizing forces distribution applied to the mutually perpendicular magnetic unit as a function of its displacement along the gap.
Figure 6A:
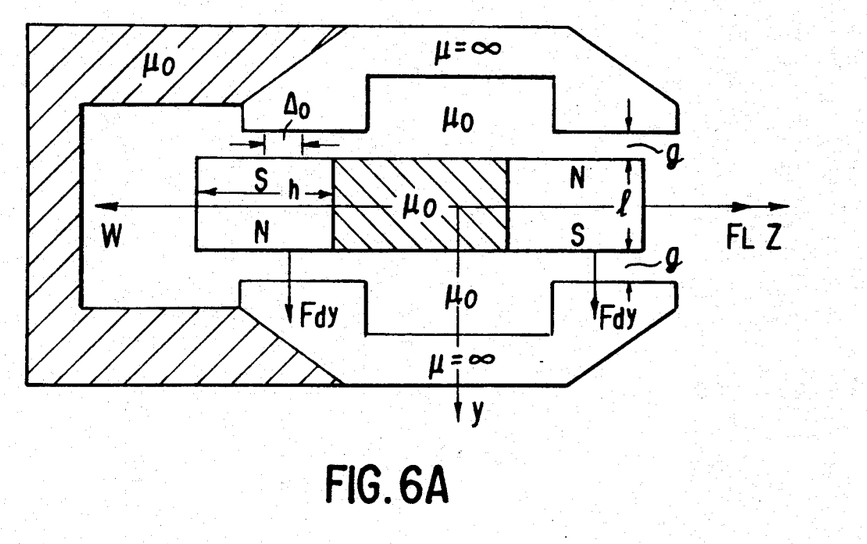
FIGS. 6A and 6B are, respectively, a cross-sectional view of the levitation device of the present invention and graphical profiles of the magnetic stabilizing and destabilizing forces distribution applied to the mutually perpendicular magnetic units as a function of its displacement along the gap.

It is also possible to design a component similar to the above mentioned component which has analogous properties but which uses a gravitational field (FIG. 6A). In this component the air gap between the core shoes as well as the stabilizing force have a vertical orientation along the axis OZ, and its iron cores are assembled similar to the device shown in FIG. 5A. In the component, the working body, pressing with its weight W on the upper magnet of the magnetic unit, provides the preliminary shift $\Delta_0$ downwards as shown in FIG. 6A. This device corresponds to the second displacement type discussed earlier.

In this embodiment of the invention that utilize a gravitational field, the magnetic force $F_L(z)$ serves as a levitational force. This force always equals the total weight W of the magnetic unit and the working body.

Figure 1D:
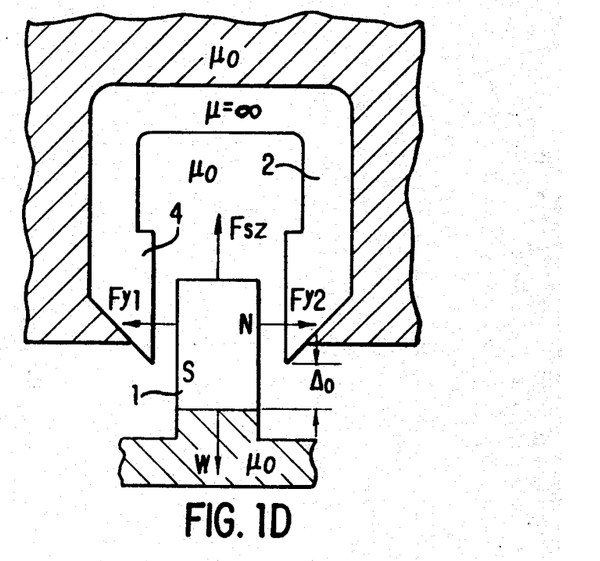
FIG. 1D is a cross-sectional, front view of the levitation device constructed according to the principles of the invention.
Figure 6B:
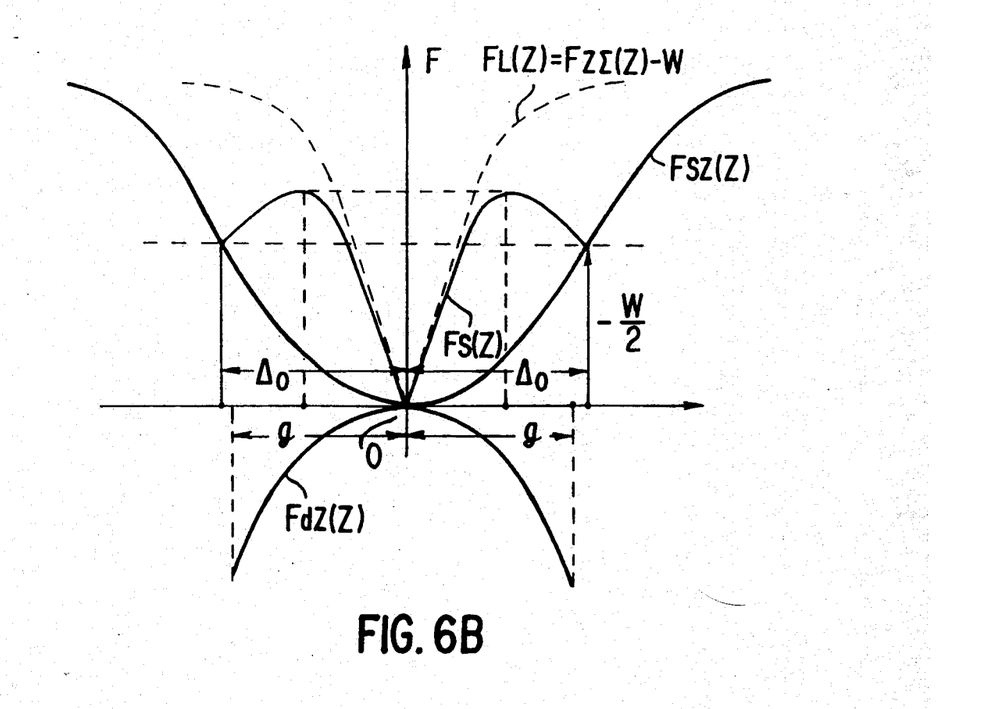

By choosing dimensions of the magnets and cores purely to provide a displacement $\Delta_0$ that corresponds to the inflection point on the original curve $F_z(z)$ (FIG. 6B), the resulting levitational force $F_L(z)$ equals the sum of magnetic stabilizing forces applied to the upper $F_{zu}$ and bottom $F_{zb}$ magnets $(F_L(z)=F_{z\Sigma}(z)+W=F_{zu}+F_{zb}-W)$. The profile of Fzs(z) shown in FIG. 6B by a dashed line. The corresponding levitational force stiffness in the vicinity of the equilibrium position equals twice the maximum stiffness $2k_m$ calculated for the stabilizing force $F_L(z)$. This element is called the "Levitation device" see patent application Ser. No. 764,734). The simplest version of the levitation device is shown in FIG. 1D.

Figure 3:
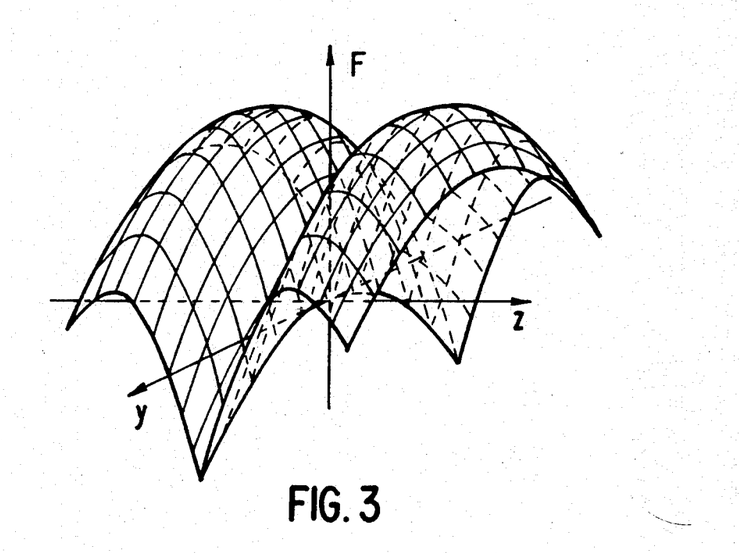
FIG. 3 is a diagram of the magnetic force distribution applied to the magnetic unit as a function of an arbitrary displacement of the magnetic unit in the plane coincident with the cross-section of the gap.

The diagram of the distribution of the force F(y,z) applied to the magnet of the single device (FIG. 1A) depends on its arbitrary displacement in the plane (x=0) and is represented in the form of a saddle-shaped surface with a smooth minimum of the force $F(0,0)=0$ shown in FIG. 2. By rigidly coupling the two similar devices of FIG. 1A this surface is transformed into another saddle-shaped surface (FIG. 3) with a sharp minimum of the force $F(0,0)=0$ located in the plane (z=0). By obtaining the component of the two coupled devices, with such diagram of the force distribution applied to the magnetic unit, there is the possibility of designing various magnetic levitation self-regulating systems that include rigidly connected devices for both stabilization and levitation. The stabilizing forces therein absolutely exceeds the destabilizing ones in the vicinity of the equilibrium position of its magnets, thus providing a stable hovering of the magnets supporting the working body within the magnetic field.

Various embodiments of the magnetic levitation self-regulating systems will be illustrated below. For now it is worth emphasizing that, whatever design is used, all the systems are distinguished by a common feature—they all include several devices and component similar to those shown in FIG. 1, 4, 5, and 6. Specifically, all the cores in the systems are rigidly fixed on a non-magnetic foundation, forming a stator. Furthermore, all the magnetic units, which are rigidly connected by non-magnetic couplers, form a levitator stably hovering in the magnetic field.

It is important to point out that because both devices, levitation and stabilization, have a cylindrical shape and further because of the gravitational independence on the coordinates, the following conclusion can be drawn: eliminating only two degrees of freedom along the axes OY and OZ in the system of the invention leads automatically to the elimination of three more degrees of freedom: roll, tilt and pitch.

By rotating the levitator around any of the major axes OX, OY or OZ, the corresponding couple of forces which tend to restore the levitator to its equilibrium position are instantly created.

Figure 5B:
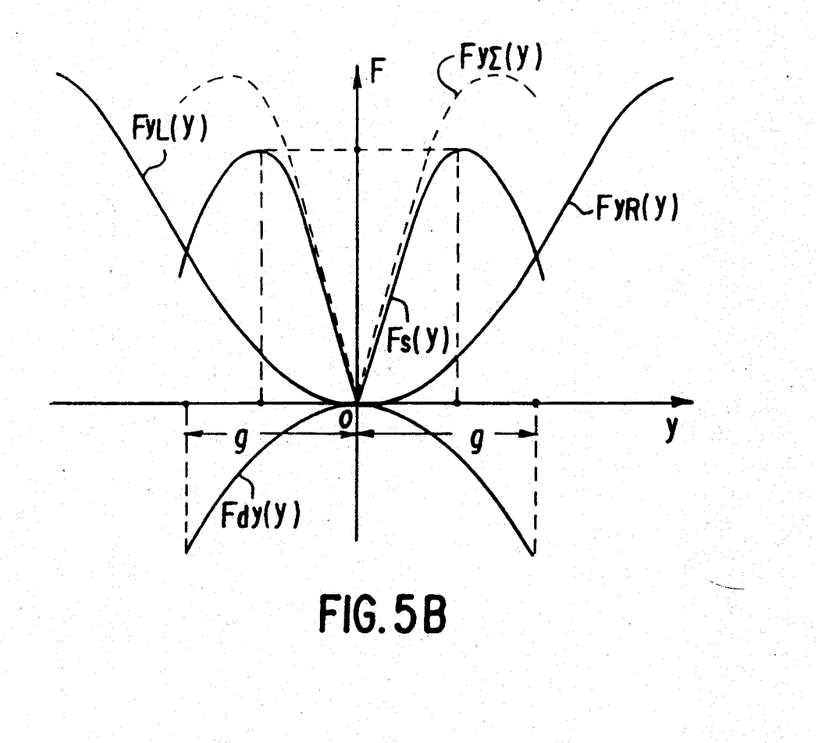

Thus, from the above examples seen in FIGS. 4 through 6, it can be seen that utilizing rigid couplers and/or a gravitational field allows a system to be created with magnetic forces acting in two mutually perpendicular directions which tend to restore the levitator to the equilibrium position, thus providing system stability. To achieve this stability, it is sufficient, for example, to rigidly couple together the three components shown in FIG. 7. One of these components is a stabilization device, and the other two are levitation devices. The stabilizing forces in these three components are mutually perpendicular. By varying the dimensions of the magnets and cores and fixing the distance $t_0$ between them, it is possible to change the stabilizing force stiffness of the system, thus allowing one to use the horizontal force acting in the horizontal component (i.e., the stabilization device) to prevent the attraction of the vertical magnetic unit to the cores, while the vertical components (i.e., the levitation device) create vertical forces preventing the attraction of the horizontal magnetic units to the cores. Rigid couplers and gravity transfer the forces from one component to the other and prevent free magnetic movement in each of the components in the direction of the destabilizing magnetic forces.

A surface (see FIG. 8) corresponding to the resulting force distribution of the system shown in FIG. 7 is created as a result of the intersection of two mutually perpendicular saddle-shaped surfaces (see FIG. 3) having a sharp minimum.

Figure 8:
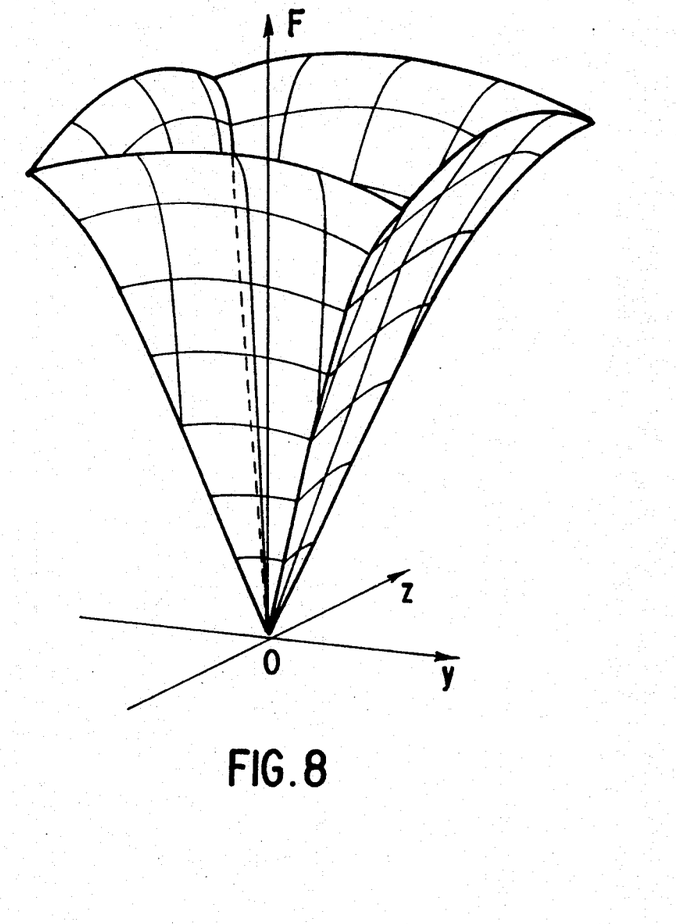
FIG. 8 is a diagram of the magnetic force distribution applied to the levitator of the magnetic levitation self-regulating system used for high speed ground transportation.

As shown in FIG. 8, under such a combination of components their extreme points ($F_y=0$, $F_{dz}=0$, for FIG. 4 and $F_z=0$, $F_{dy}=0$ in FIG. 6) coincide with the point of stable equilibrium (i.e., the origin of the coordinate system in FIG. 8). The components of the resultant force $F_s(y,z)$ applied to the levitator are described as follows:

$$F_{sy}(y,z)=F_{y\Sigma}(y,z)-F_{dy}(y,z)=2k(y)y-a_yy^2>0(y<g),$$

$$F_{sz}(y,z)=F_{z\Sigma}(y,z)-W-F_{dz}(y,z)=2k(y)y-a_zy^2>0,$$
$(z<g)$

Components of the forces $F_{sy}$ and $F_{sz}$, shown in FIG. 4 and FIG. 6 by solid lines, are oriented upwards in the vicinity of the stable equilibrium position. Thus, these components are directed opposite to the levitator displacement.

Thus, the fact that the curves representing the destabilizing forces $F_d$ are nearly quadratic parabolas, guarantees unconditional predominance of the stabilizing forces when applied to the levitators in the vicinity of the origin of the co-ordinates. Any final value of a stabilizing attractive force in the vicinity of the origin will always be larger than the destabilizing force. This is infinitesimal in the vicinity of the origin, regardless of its amplitude. The local minimum of both the resulting magnetic forces F and the potential energy at the origin is thereby guaranteed.

The diagram of the system stabilizing force $F_s(y,z)$ distribution has a lateral face of an inverted tetrahedral pyramid (see FIG. 8). The top of the pyramid coincides with the origin and its sides are concave near its foundation. The value of the stabilizing force is proportional to the value of the displacement of the levitator in the plane Y0Z. The potential energy of the system (the result of integrating the force $F_s(y,z)$ is therefore represented by a convex parabolic surface in the vicinity of the origin and it has a local minimum at this point. Consequently, the requirements of Lagrange's theorem are satisfied and local stability of the magnetic system of the invention is guaranteed.

The stable levitation system is designed for forward motion in a gravitational field. To provide the levitation system with stability, its components are provided with the following characteristics (see the magnetic devices of FIG. 1 and the components of FIG. 4, 5, and 6).

a. any displacement of the magnetic unit across the air gap (within the cross-section of the core) produces a destabilizing force that attracts the magnetic unit to the nearest half of the core. The value of this force is proportional to the square of the displacement value $\Delta_0$;

b. any displacement of the magnetic unit along the air gap (within the cross-section of the core) produces a stabilizing force that tends to return the unit back to its symmetrical equilibrium position and pulls the permanent magnet into the air gap; the stabilizing force increases by increasing the longitudinal displacement z of the permanent magnet from its equilibrium position. Simultaneously, the stiffness of the stabilizing force $k(z)=dF/dz$ increases up to a maximum $k(\Delta_0)=k_m$;

c. the stiffness of the stabilizing force (i.e., the derivative of the force with respect to the displacement coordinate) applied to the magnetic unit in the vicinity of its equilibrium position can be increased from zero to a maximum by changing the length of the coupler between the two permanent magnets in the unit;

d. the force distribution applied to the magnetic unit, which is a function of the displacement in the gap, has a saddle-shaped surface with a minimum that equals zero in the vicinity of the origin (i.e., in the equilibrium position of the magnetic unit). Further, the surface can be sharpened (while maintaining its saddle-shape) in the vicinity of the original by varying the length of the coupler between the magnets.

The magnetic levitation self-regulating system, if designed to work in a weightless environment, should include as its components only the stabilization devices (FIG. 4A and 5A).

Figure 13A:
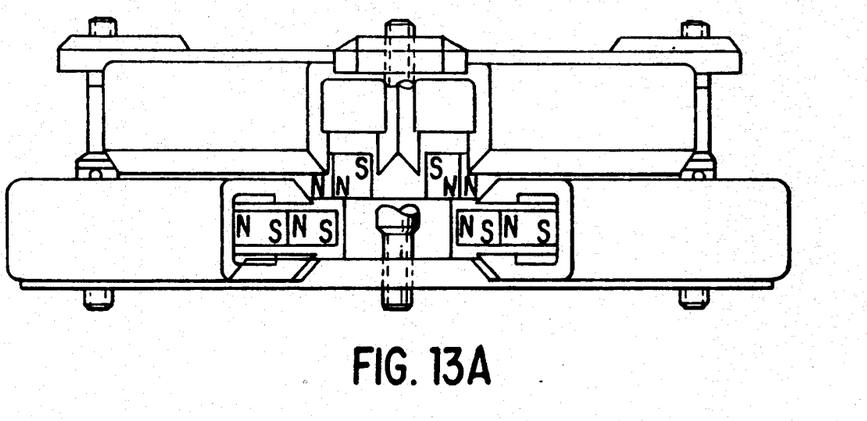
FIGS. 13A and 13B are, respectively, a front view and a plan view of the magnetic levitation self-regulating system designed for the stable hovering of a working body in a magnetic field.
Figure 13B:
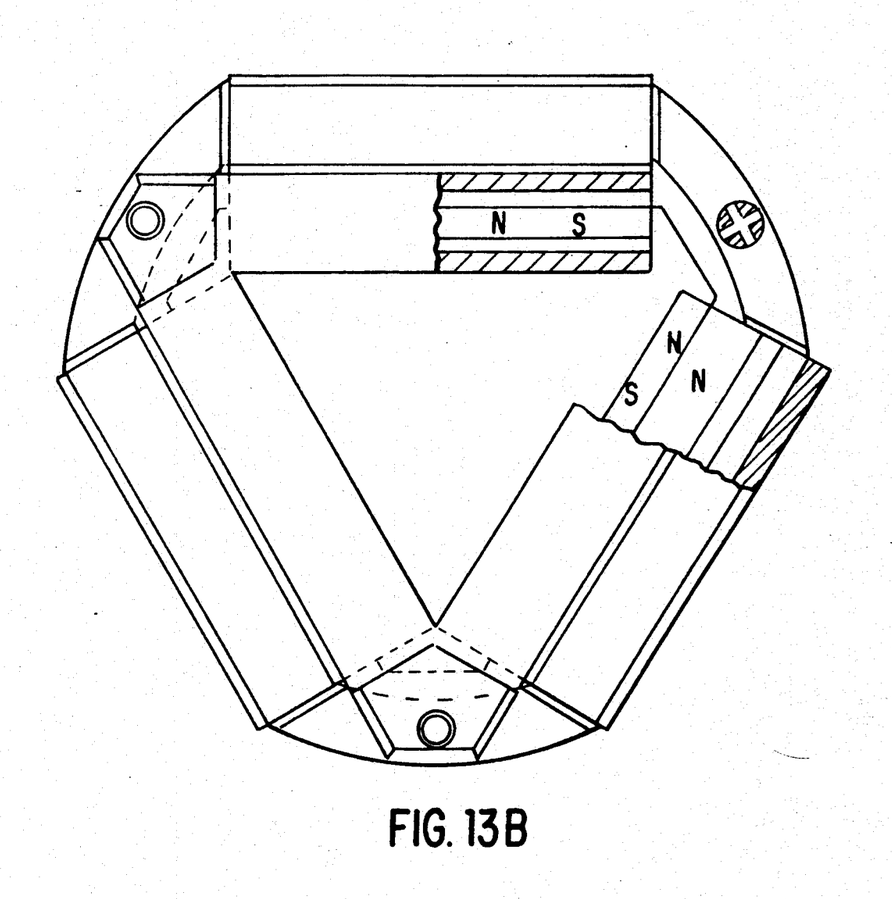

Similarly, it is possible to design a magnetic system which is stable in all three directions. To achieve this stability it is necessary to rigidly couple the system that is stable in only two directions of space to the component of FIG. 4A which is oriented along the third direction. FIG. 13 shows an alternative embodiment of the system. The same requirements for the couplers between the magnetic units, discussed above for the system of FIG. 7, are utilized in this case as well.

The design of the stable magnetic devices of the invention is also applicable to the construction of self-regulating magnetic bearings. The bearings can work both in a gravitational field and in a weightless environment.

Two embodiments are possible for the bearings that work in a gravitational field: one with horizontal and one with vertical pivotal axes.

To construct magnetic bearing with a horizontal pivotal axis it is necessary to bend the stabilization and levitation devices (FIG. 7) around the horizontal pivotal axis, so that their cylindrical parts form coaxial rotational bodies. Next, all the parts must be connected together by couplers, thus orienting the stabilizing forces in the stabilization and levitation devices along and perpendicular to the pivotal axis, respectively. All the iron cores should be fixed on a non-magnetic ring forming an inner race of the bearing, which is disposed on the shaft of the working body. All the magnetic units should also be connected and attached to another non-magnetic ring forming an outer stationary race of the bearing.

The lengths of the couplers between the magnetic units of the stabilization devices and the outer race should be adjustable in a vertical direction and are a function of the weight of the working body.

Figure 9:
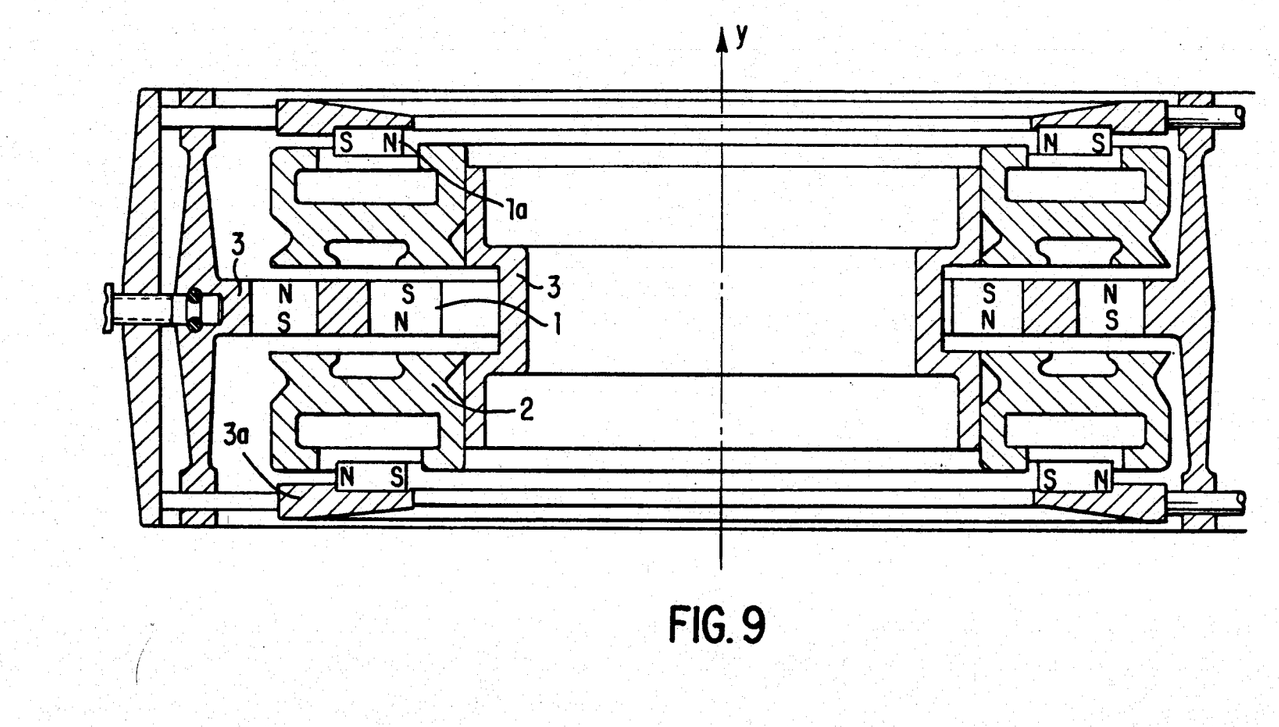
FIG. 9 is a cross-sectional view of a magnetic bearing with a horizontal pivotal axis designed to work in a gravitational field.

FIG. 9 shows another embodiment of the invention that has a horizontal pivotal axis.

To design the magnetic bearing with a vertical pivotal axis, it is also necessary to bend the stabilization and levitation devices (FIG. 7) around the vertical pivotal axis, so that their cylindrical parts form coaxial rotational bodies. It is then necessary to connect together all the parts with couplers, orienting the stabilizing forces, vice versa, in the levitation and stabilization devices along and perpendicular to the pivotal axis, respectively. All the iron cores, as well as the bearings with a horizontal pivotal axis, should be fixed on a non-magnetic ring forming an inner race of the bearing which is disposed on the shaft of the working body. All the magnetic units should also be connected and attached to another non-magnetic ring forming an outer stationary race of said bearing.

The lengths of the couplers between the magnetic units of the stabilization devices and the outer race should be adjustable in a vertical direction and are a function of the weight of the working body.

Figure 10:
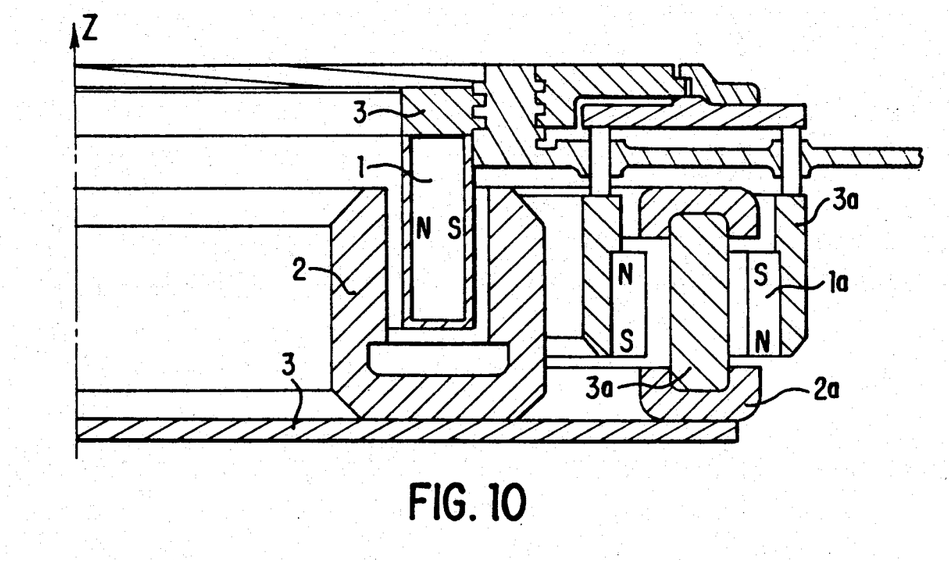
FIG. 10 is a cross-sectional view of a magnetic bearing with a vertical pivotal axis designed to work in a gravitational field.

FIG. 10 shows yet another embodiment of the magnetic bearings of the invention. To design the magnetic bearing for rotation of the working body in a weightless environment, only the stabilization devices (FIG. 4A and/or FIG. 5A) can be used. These devices should be bent in a manner similar to those described above. The only difference in this embodiment is that the devices should be connected in such a way as to allow some of the stabilizing forces to be oriented along the pivotal axis with the remaining forces oriented perpendicular to the pivotal axis. Another distinction of this embodiment is that all the magnetic units are rigidly attached to the non-magnetic outer race of the bearing.

Figure 11:
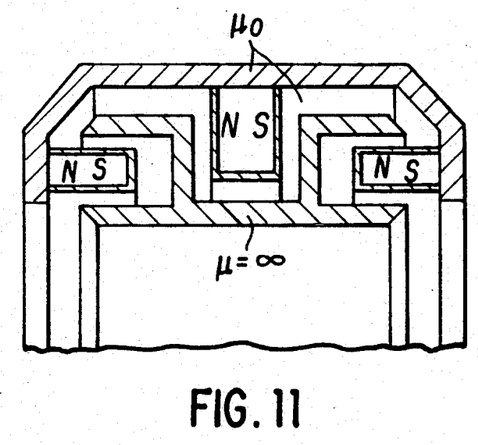
FIG. 11 is a cross-sectional view of a magnetic bearing designed to work in a weightless environment.
Figure 12:
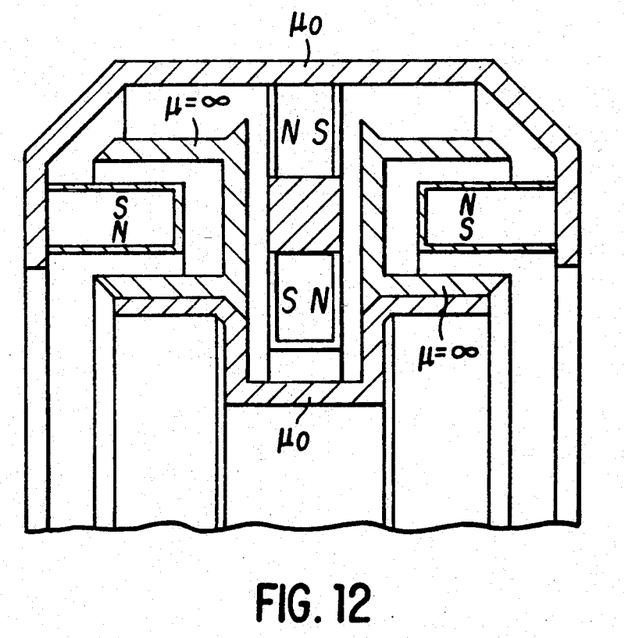
FIG. 12 is a cross-sectional view of an alternative embodiment of the magnetic bearing designed to work in a weightless environment.

The various designs of the magnetic bearings used under weightless conditions are shown in FIGS. 11 and 12.

According to one embodiment of the invention the levitation device seen in FIG. 7 utilizes a permanent magnet formed from Crumax 355. The magnet has a coercive force Hc=890 KA/M and a permeance coefficient of 1.07. The Cross sectional dimensions of each magnet is $S=l \times h=0.05 \times 0.08$ m$^2$ with the distance between poles 1 being 0.05 m and the height of the magnet h being 0.08 m.

The largest levitational force $F_{Lmax}$ (per magnet) occurs When $g=0.02$ m, for which $F_{Lmax}$ is greater than $1.1^t/m=11$ kN/m/. For a shift of 0.9 g, the destabilizing force $F_d(0.9\ g)$ is less than $1^t/m=10$ kN/m (per magnet). The surplus (i.e., excess) value of the levitational force $F_{Ls}$ is approximately equal to 0.45 $^t$/m (per magnet).

The stabilization device shown in FIG. 7 uses magnets each having a cross section of $s=l \times h=0.1 \times 0.06 m^2$ with a distance between the l of 0.1 m. The height h of each magnet is 0.06 m. The largest attainable stabilizing force $F_{smax}$ (per two magnets) occurs when $g=0.02$ m, for which $F_{smax}$ is greater than $2.2^t/m=22$ kN/m. For a shift of 0.9 g, the destabilizing force $F_d(0.9\ g)$ is less than $2.2^t/m=22kN/m)$ (per two magnets). The surplus (excess) value of the stabilizing force $F_{ss}$ is approximately $1.8_t/m=18kN/m$ (per two magnets).

What is claimed is:

1. A magnet levitation self-regulating system comprising monotypic magnetic devices combined together by rigid non-magnetic couplers; said magnetic device comprising two cylindrical parts extended along a cylinder generatrix:

a. an iron core having a symmetrical C-shaped cross section and an air gap between its core shoes; and b. a permanent magnet having a rectangular cross-section disposed in said air gap;

wherein all the iron cores of said magnetic devices are fixed on a common foundation by a first plurality of rigid non-magnetic couplers and formed a stator assembly; all the permanent magnets of said magnetic devices are connected together by a second plurality of rigid non-magnetic couplers and form a levitator assembly; said permanent magnets of said levitator generate an original magnetic field and magnetize the stator cores; said stator cores create a secondary magnetic field; both said original and secondary magnetic fields create a magnetic levitation force that provides a stable hovering of said levitator in a resulting magnetic field of said system.

2. A magnetic levitation self-regulating system of claim 1 wherein said permanent magnet is magnetized across said air gap of said core and has a position of unstable equilibrium; when said magnet is displaced from its equilibrium position two magnetic forces appear which are:

a. a stabilizing force pulling said magnet into the air gap along the gap; and
b. a destabilizing force attracting said magnet to the nearest core shoe across the gap;
c. both said forces are applied to said magnet and lie in a plane of its cross-section;
d. said stabilizing force tends to return said magnet back to its equilibrium position;
e. said destabilizing force tends to increase the magnet displacement from its equilibrium position.

3. A magnetic levitation self-regulating system of claim 2 wherein the stabilizing force increases while the magnet displacement grows along said gap and then decreases, though the displacement continues to grow. Simultaneously, the stabilizing force stiffness also increases, reaches its maximum on a certain value of displacement $\Delta_0$, and then decreases; the destabilizing force increases proportionally to the square of the magnet displacement value across said gap. Simultaneously the destabilizing force stiffness increases proportionally to the value of said displacement, starting from zero.

4. A magnetic levitation self-regulating system of claim 3 wherein two identical magnetic devices are composed of their cylinder generatrices parallel to each other and coupled together, forming a "stabilization device" wherein two said coupled magnets form a magnetic unit with a length of said non-magnetic coupler between the two said iron cores different from a length of the coupler between the two permanent magnets by value $2\Delta_0$; the stabilizing force stiffness applied to said magnetic unit in the vicinity of its equilibrium position equals a doubling of the maximum value of the stabilizing force stiffness of the single magnetic device.

5. A magnetic levitation self-regulating system of claim 3 wherein two identical magnetic devices are composed of their cylinder generatrices parallel to each other and coupled together, forming a "levitation device" wherein the lengths of the two couplers between the two iron cores and between the two permanent magnets respectively are equal to each other and the stabilizing force applied to said magnetic unit, as well as its stiffness, is doubled.

6. A magnetic levitation self-regulating system of claim 4 designated to provide forward motion of the working body in the gravity field, wherein said levitation and stabilization devices are disposed so that their cylinder generatrices are parallel to the direction of the movement of the working body; said devices are connected in such a manner that the stabilizing forces therein are oriented:

a. in said stabilization devices, horizontally;
b. in said levitation devices, vertically; all the iron cores of said devices are fixed rigidly on a non-magnetic foundation and form a stator assembly;
c. all the magnetic units are coupled by non-magnetic couplers and form a levitator assembly supporting said working body and stably hovering in the magnetic field;
d. the lengths of said couplers connecting said stabilization devices with said levitator are adjustable for preliminary tuning, depending on the weight of the working body.

7. A magnetic levitation self-regulating system of claim 4 designated to provide the rotation of the working body around the horizontal axis in the gravity field, which involves a magnetic bearing, wherein the stabilization and levitation devices are bent with their cylindrical parts forming coaxial rotation bodies and then connected together by couplers, orienting the stabilizing forces in said devices along and perpendicular to the pivotal axes respectively; all the iron cores of said devices are fixed on a non-magnetic ring, forming an inner race of said bearing fitted on the shaft of the working body; all said magnetic units are also connected and attached to another non-magnetic ring, forming an outer stationary race of said bearing; the lengths of the couplers between the magnetic units of the stabilization devices and said outer race are adjustable in a vertical direction depending on the weight of said working body.

8. A magnetic levitation self-regulating system of claim 5 designated to provide the rotation of the working body around the vertical axis in the gravity field, which involves a magnetic bearing, wherein the stabilization and levitation devices are bent with their cylindrical parts forming coaxial rotation bodies and then connected together by couplers, orienting the stabilizing forces in said devices perpendicular and along the pivotal axes respectively; all the iron cores of said devices are fixed on a non-magnetic ring, forming an inner race of said bearing fitted on the shaft of the working body; all said magnetic units are also connected and attached to another non-magnetic ring forming an outer stationary race of said bearing; the lengths of the couplers between the magnetic units of the stabilization devices and said outer race are adjustable in a vertical direction depending on the weight of said working body.

9. A magnetic levitation self-regulating system of claim 5 designated to provide the rotation of the working body around a pivotal axis in weightlessness, which involves a magnetic bearing, wherein only the stabilization devices are used; said stabilization devices are bent with their cylindrical parts forming coaxial rotation bodies and then connected together by couplers in such a manner that some of them generate stabilizing forces oriented along the pivotal axis, the other generate stabilizing forces oriented perpendicularly to it; all the iron cores of said devices are fixed on a non-magnetic ring forming an inner race of said bearing fitted on the shaft of the working body; all said magnetic units are also connected and attached to another non-magnetic ring forming an outer stationary race of said bearing.

10. A magnetic levitation self-regulating system of claim 6 designated to provide the stable hovering of the working body in the gravity field, wherein said stabilization and levitation devices are disposed and connected together in such a manner that their stabilizing forces act in three reciprocally perpendicular directions with the stabilizing forces in the levitation devices oriented vertically; all the iron cores of said devices are fixed on a non-magnetic foundation forming the stator assembly; all said magnetic units are also connected by non-magnetic couplers, forming the levitator assembly which stably supports the working body in the magnetic field; the lengths of the couplers connecting the magnetic units of the stabilization devices with the magnetic units of the levitation devices are adjustable in a vertical direction for preliminary tuning, depending on the weight of said working body.

11. A magnetic levitation self-regulating system of claim 6 designated to provide the stable hovering of the working body in weightlessness, comprising the stabilization devices only; the said stabilization devices disposed and connected together in such a manner that their stabilizing forces act in three reciprocally perpendicular directions; all the iron cores of said stabilization devices are connected by non-magnetic couplers, forming the stator assembly; all said magnetic units are also connected by non-magnetic couplers, forming the levitator assembly which stably supports the working body in the magnetic field.

12. A magnetic levitation self-regulating system of claim 10, wherein the horizontal stabilizing forces, generated by said stabilization devices, and applied to said levitator, in the vicinity of the levitator equilibrium position suppress horizontal destabilizing forces appearing in said levitation devices; said suppression of said horizontal destabilizing forces is achieved by reinforcing the stiffness of the horizontal stabilizing forces by preliminary shift of the permanent magnets in said magnetic units; the vertical stabilizing forces, generated by said levitation devices and also applied to said levitator, suppress the vertical destabilizing forces appearing in said stabilization devices; said suppression of said vertical destabilizing forces is achieved by doubling the value and stiffness of the vertical stabilizing forces by vertical displacement of said magnetic unit as a result of the pressure of the weight of the working body; because of destabilizing forces which increase proportionally to the square of the magnet displacement value across said air gap, the unconditional suppression of the said destabilizing forces by stabilizing forces in the vicinity of the equilibrium position of the levitator is achievable.

13. A magnetic levitation self-regulating system of claim 11, wherein the stabilizing forces, generated by said stabilization devices, and applied to said levitator, in the vicinity of the levitator equilibrium position suppress the destabilizing forces appearing in the adjacent devices oriented perpendicularly; said suppression is achieved by the reinforcement of the stiffness of the stabilizing forces by the preliminary shift of the permanent magnets in said magnetic units; because of the destabilizing forces, which increase proportionally to the square of the magnet displacement value across said air gap, the unconditional suppression of the said forces by stabilizing forces in the vicinity of the equilibrium position of the levitator is achievable.

* * * * *